Oct. 23, 1945.   C. J. HOLLAND   2,387,265
SPRING FOR VEHICLES
Filed Nov. 3, 1941
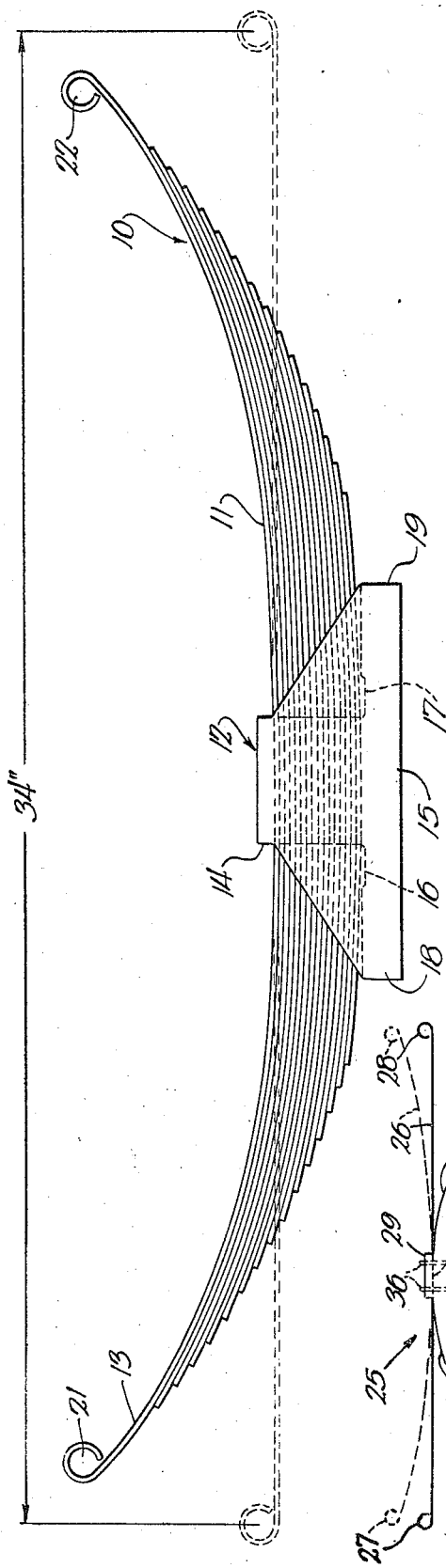
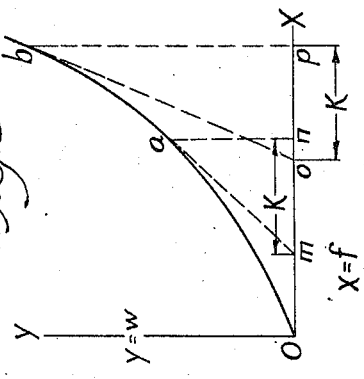
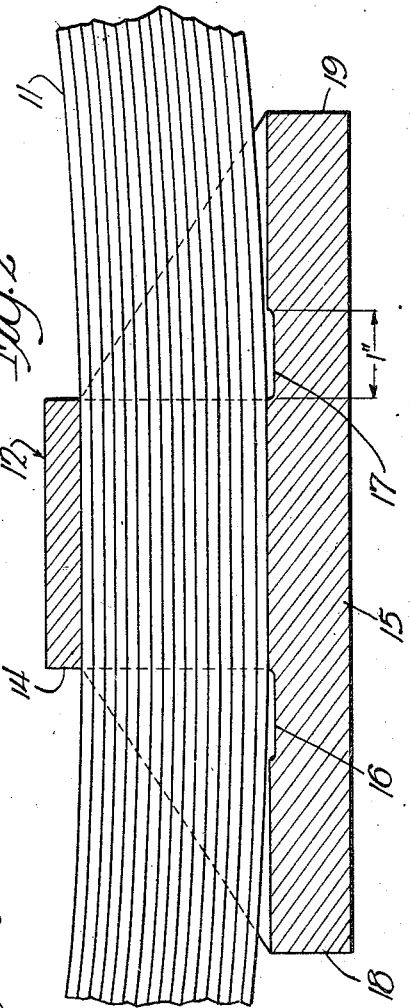
INVENTOR.
Cyrus J. Holland
BY Brown
atty.

Patented Oct. 23, 1945

2,387,265

UNITED STATES PATENT OFFICE 2,387,265

SPRING FOR VEHICLES

Cyrus J. Holland, Chicago, Ill., assignor to Holland Company, a corporation of Illinois Application November 3, 1941, Serial No. 417,662

5 Claims. (Cl. 267—47)

This invention relates to spring suspension for vehicles.

One of the objects of the invention is the provision of a new and improved leaf spring for use in supporting vehicle bodies in such manner that the vehicle body will be supported as softly when empty, or partly loaded, as when heavily loaded.

Another object of the invention is the provision of a leaf spring having a constant period of vibration for variable loads.

A further object of the invention is the provision of a leaf spring having a constant frequency for variable loads that is simple in construction, effective in use, and that may be substituted for the conventional leaf spring employed in spring suspension for motor vehicles.

Other and further objects and advantages of the invention will appear from the following description, taken in connection with the accompanying drawing, in which Fig. 1 is a side elevation of a semi-elliptic multi-leaf spring embodying the present invention;

Fig. 2 is a longitudinal vertical section thereof, with parts broken away, on a somewhat enlarged scale;

Fig. 3 is a graph illustrating a load deflection curve for the spring; and

Fig. 4 is a diagrammatic view of a modified form of spring arrangement.

The spring herein disclosed is semi-elliptic, and is designed to support a conventional automobile body, such as a body for a pleasure or delivery car, or a truck body. Heavier springs involving the same principle are adapted to be used on railway cars and the like. It is common practice to employ semi-elliptic multi-leaf springs for supporting motor vehicle bodies on the chassis frame of said vehicles. While these springs ride softly if the vehicle is loaded, they are more or less unpleasant when lightly loaded. The reason for this is that the conventional leaf spring has a comparatively high rate of vibration if lightly loaded.

It has been determined that if the frequency of the spring suspension of a passenger vehicle be high, say, around 90 or 100 vibrations, they have what may be termed rough riding qualities and are unpleasant; whereas, if frequency of vibration of the springs is low, say, on the order of 60 per minute, the riding qualities are what may be termed soft or pleasant. In conventional springs the frequency of the springs varies with the load. If the load is light the frequency is high, and if the load is heavy the frequency is comparatively low.

The present invention seeks to remedy this objectionable condition by the provision of a new and improved leaf spring that will have a constant frequency of vibration, irrespective of the load. In other words, the spring and its mounting is such that the spring has a constant effective static deflection for variable loads. This constant frequency should be such as to give the spring a pleasant or soft riding quality.

While the spring selected to illustrate the invention is a multi-leaf semi-elliptic spring, it is understood that this is by way of example only, as leaf springs of other types or forms may be employed.

Referring now to Fig. 1 of the drawing, the reference numeral 10 designates one of the resilient units including its spring band. The unit comprises a group of leaf springs 11, which are held clamped together by a band 12, as is usual in such constructions. The group 11 comprises an upper leaf 13 and a plurality of leaf springs of gradually diminishing length beneath the leaf 13. The leaves are of such length that they are fully graduated, and are nested to form a unitary group.

The band 12 has a base 15 on which the group of leaves seat or rest, as shown more clearly in Fig. 1 of the drawing. The base 15 of the band 12 is provided at each side of the tie member 14 with depressions 16, 17, on the upper side thereof, and extends laterally beyond these depressions to form the extensions 18, 19, which, in the construction shown, is a continuation of the base 15. The depressions 17, 18, permit an initial downward movement of the spring ends before their effective lengths begin to shorten, i. e., before they engage the base member beyond said depressions. The tie member 14 holds the spring unit in firm contact with the base 15, but the curvature of the unit is such that it does not come in contact with the upper surfaces of the extensions 18, 19, until the load exceeds the minimum load.

When a load is applied to the spring unit the ends of the semi-elliptic spring are forced downwardly, and if the load be sufficient it will come in contact with the inner upper surface of the extensions 18, 19, and a further load will cause the spring ends to roll along this surface so that the free resilient portions of the spring ends will gradually be shortened, thereby gradually stiffening the spring as the load is applied. The springs and the base member are so constructed that they cooperate to produce a spring unit having a constant frequency of vibration for variable loads. Thus, the base 15 serves as means to progressively shorten the effective length of the leaf spring with increasing load, the effective length varying as required to keep the effective static deflection of the spring unit substantially constant for variable loads.

The expression "constant effective static deflection" is a constant for a specified range of loads for any particular spring embodying the invention, and may be represented on a load deflection curve diagram, as shown in Fig. 3, with the load as ordinate and the deflection as abscissa, the length between the intercepts on the $x$-axis of the tangent to the curve at any point, and the perpendicular dropped from said point to the $x$-axis, viz. the subtangent, shall be a constant which represents the effective static deflection of the spring.

By definition, then, the tangent of any angle between such subtangent and tangent at any point is $$\frac{y}{k}$$

which is, therefore, the first derivative of the variable function, and $$\frac{dy}{dx} = \frac{y}{k}$$

from which $$\frac{dx}{dy} = \frac{k}{y}$$

$$dx = \frac{k\,dy}{y} = k \cdot \frac{dy}{y}$$

$$x = \int k \cdot \frac{dy}{y} = k \int \frac{dy}{y}$$

Since $$\int \frac{dy}{y} = \log_e y \cdot$$

(1) $\qquad x = k \log_e y + c$

In substituting the load into this formula, it must be considered that we are concerned with hundreds of pounds, but that we are plotting natural logarithms of $$\frac{W}{100}$$

if W is the load in pounds. Therefore, we can state the relationship in terms of the load and deflection thus:

(2) $\qquad f = k \log_e \frac{W}{100} + c$ in which $f$ = deflection under any load.
$k$ = the constant effective "static deflection" as defined.
$w$ = any load in pounds.
$c$ = a constant of integration, which varies with W and with $f$ in terms of deflection from free length; that is, it is a constant which determines the location of the line on the graph with respect to the $y$ axis.
$\log_e$ = logarithms according to the Naperian or hyperbolic system in which the base is 2.718281828. In order to simplify the calculations the weight or load may be represented in hundredweights.

The curve thus produced applies only when the load under consideration produces a deflection equal to or greater than $k$. This means that up to a certain point on the curve from the origin it is not possible to achieve constant effective static deflection, this point being defined as the point where the normal to the $x$-axis at this point intercepts the $x$-axis at a distance $k$ from the origin. Therefore, the load deflection characteristic is a straight line from zero to a deflection equal to $k$, and for any greater load follows the formula as developed.

The spring unit is provided with the usual spring attaching eyes 21, 22, as is usual in such constructions. The following are dimensions of the different parts shown in Fig. 1, where the spring is designed to support an automobile body, the spring operating between the limits of 800 and 1200 pounds. There are sixteen leaves 1¾" x ⅛" fully graduated. The base 15, including the extensions 18, 19, is 9" long, and the band or tie member 14 is 3" long. The depressions 16, 17, are 1" wide, and may be of any suitable width and depth. The concavity of the upper leaf which, when straightened, is 34" long, as indicated in Fig. 1, when the same is free is such that the attaching eyes 21, 22, will be 9.114" above the base of the leaf, and the spring is so constructed that it will have a constant effective static deflection of 6.485".

The spring described above conforms to the formula $$f = k\left(\log_e \frac{W}{100}\right) + c$$

In this case $$f = 6.485\left(\log_e \frac{W}{100}\right) - 7.000''$$

for a constant effective static deflection of 6.485".

The dimensions given above are for the construction of a spring with certain characteristics. If these characteristics are to be different, as, for instance, if the static deflection constant is to be more or less than that given above, or a total deflection of the spring is to be more or less than the above, or the loads to be carried have different limits, then the dimensions of the leaves, their number, effective span, length, camber and arrangement on the base will necessarily be different. In order that the riding qualities shall be what may be termed soft, the arrangement should be such that the frequency of vibration is not high, possibly on the order of 60 per minute, for passenger motor vehicles, and may be below that number, and should be substantially constant for variable loads, and will be if the spring conforms to the formula given above.

In Fig. 4 is shown a modified construction of the leaf spring unit. In this form of construction a single leaf is shown, but this is by way of example only. As shown, the resilient unit 25 comprises a single leaf of spring material 26, having the eyes 27, 28, at the ends thereof for attachment to the vehicle body and to a suitable shackle, as is usual in such constructions. The spring has a central band 29, the lower portion of which forms a base 31. The spring leaf 26 may be concave upwardly prior to installation, as shown in dotted lines, and is straight, as shown in full lines, when supporting the vehicle body. The base 31 may be rigidly secured to the axle 35 of a motor vehicle by clamps 36, which tie or fasten the spring unit to the axle in the usual or any well known manner.

Suitable means are provided for causing the spring to have a constant frequency for variable loads. As shown, the means employed for accomplishing this function may comprise a base member 31, having curved upper surfaces 32, 33, at each end thereof. The central portion 34 of the base, on which the leaf spring rests, is flat for the length of the band, and then the upper surface curves downward toward each end.

In the operation of the device as the spring is flexed, it will roll along the curved surface of the base 31, thus causing an effective shortening and a consequent stiffening of the spring as the load is increased. The curves 32 and 33 are such that the effective static deflection of the spring will remain substantially constant for variable loads.

In other words, the frequency of the spring will remain substantially constant for all loads.

Where the spring unit comprises a plurality of leaves, these leaves will move relative to each other as the unit is flexed. This relative movement results in frictional resistance to the flexing of the spring, and this resistance may be sufficient to greatly reduce or prevent entirely harmonic vibration of the spring assemblies.

It will thus be seen that with either form of construction means are provided that cooperate with a conventional leaf spring to provide a unit that has a constant frequency of vibration.

The manner in which the formula $$x = k \log_e y + c$$

may be applied to the problem of designing a leaf spring combination of the present character to meet various specifications will be readily apparent to one who is skilled in the art of spring design and is familiar with well-known spring formulae such as may be found in Kent's "Mechanical Engineering Handbook."

For example, being given the required conditions, including such items as the length of the leaf spring, load range, deflection characteristics, etc., the formula $x = k \log_e y + c$ may be first used to determine whether it is possible to design a constant frequency spring to meet the conditions. If not, the computations will inform one what constant effective static deflection may be used to meet the load condition for the range of deflection specified. Then it will be necessary to make up a table from the minimum to maximum load showing the values of total deflection for selected increments of load using the same formula $$x = k \log_e y + c$$

to determine these values for each load increment. Thereafter, application of obvious spring formulae will enable one to determine the changes in effective length required for the different increments of load to produce a constant frequency spring having the required characteristics.

It is thought from the foregoing, taken in connection with the accompanying drawing, that the construction and operation of my device will be apparent to those skilled in the art, and that changes in size, shape, proportion and detail may be made without departing from the spirit and scope of the appended claims.

I claim as my invention:

1. In a spring suspension, a semi-elliptic multi-leaf spring, the leaves of said spring being graduated and of substantially the same width, a band engaging the central portion of the leaves for holding them assembled, said band having a base portion extending to opposite sides of the band and spaced from the adjacent leaf, whereby when said spring is compressed said adjacent leaf will engage more and more of said base portion as the flexure of the spring increases, the camber and stiffness of the leaves being such relative to the cooperating face of the base that, at least between near minimum and near maximum static loading of the spring, the effective length of the spring changes in such manner that the spring follows a load deflection curve that is substantially in accord with the formula $x = k \log_e y + c$ in which $x$ = deflection,
$k$ = static deflection as defined,
$y$ = load,
$c$ = a constant.

2. In a spring suspension resilient unit for vehicles, comprising a semi-elliptic leaf spring, a band engaging the central portion of said unit and having an integral base engaging the central portion of the spring and having extensions spaced from the lower surface of said unit and extending in opposite directions beneath said unit, said leaf spring being adapted to roll along said extensions as the spring is compressed, said leaf spring and base extensions cooperating to change the effective spring length, at least between near minimum and near maximum static loading of the spring, in such manner that the spring follows a load deflection curve that is substantially in accord with the formula $x = k \log_e y + c$ in which $x$ = deflection,
$k$ = static deflection as defined,
$y$ = load,
$c$ = a constant.

3. In a spring suspension, a spring unit comprising at least one leaf spring, a support engaging the central portion of said spring, said support having its upper face at each end thereof curved outwardly and downwardly along which the ends of said spring are adapted to roll when weight is applied to said spring unit, said spring and said curved faces cooperating to change the effective length of the spring, at least between near minimum and near maximum static loading of the spring, in such manner that the spring follows a load deflection curve that is substantially in accord with the formula $x = k \log_e y + c$ in which $x$ = deflection,
$k$ = static deflection as defined,
$y$ = load,
$c$ = a constant.

4. In a spring suspension, the combination of a leaf spring, and means to progressively shorten the effective length of said spring, at least between near minimum and near maximum static loading of the spring, in such manner that the spring follows a load deflection curve substantially in accord with the formula $x = k \log_e y + c$ in which $x$ = deflection,
$k$ = static deflection as defined,
$y$ = load,
$c$ = a constant.

5. In a spring suspension, the combination of a leaf spring, and bearing means for progressive contact therewith to progressively shorten the effective length of the spring with increase in load thereby to progressively increase the rate of the spring, the resistance of said leaf spring and the configuration of said bearing means being such that, at least between near minimum and near maximum static loading of the spring, the effective length of the leaf spring changes in such manner as to cause the spring to follow a load deflection curve substantially in accord with the formula $$f = k \log_e \frac{W}{1000} + c$$

in which $f$ = deflection under any load,
$k$ = static deflection as defined,
$W$ = load in pounds,
$c$ = a constant.

CYRUS J. HOLLAND.